(12) United States Patent
Yatabe (10) Patent No.: US 6,297,622 B1
(45) Date of Patent: Oct. 2, 2001

(54) POWER SUPPLY CIRCUIT WITH MINIMIZED POWER CONSUMPTION

(75) Inventor: Satoshi Yatabe, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/663,398

(22) Filed: Sep. 15, 2000

(30) Foreign Application Priority Data

Sep. 16, 1999 (JP) .................................. 11-262662

(51) Int. Cl.$^7$ .................................................. G05F 1/613
(52) U.S. Cl. .................................... 323/222; 323/282
(58) Field of Search ................................ 323/222, 282

(56) References Cited

U.S. PATENT DOCUMENTS

| | | | |
|---|---|---|---|
| 3,736,496 | * | 5/1973 | Lachocki ............................ 323/222 |
| 4,347,474 | * | 8/1982 | Brooks et al. ..................... 323/282 |
| 4,355,277 | * | 10/1982 | Davis et al. ....................... 323/222 |
| 5,003,454 | * | 3/1991 | Bruning ............................. 323/222 |
| 5,610,502 | * | 3/1997 | Tallant et al. ..................... 323/222 |
| 5,675,240 | * | 10/1997 | Fujisawa et al. .................. 323/282 |
| 6,087,816 | * | 7/2000 | Volk .................................. 323/282 |
| 6,160,385 | * | 12/2000 | Feldkeller ......................... 323/222 |
| 6,166,527 | * | 12/2000 | Dwelley et al. .................. 323/282 |
| 6,175,218 | * | 1/2001 | Choi et al. ....................... 323/222 |

\* cited by examiner

*Primary Examiner*—Jeffrey Sterrett (57) ABSTRACT

A power supply circuit is provided which converts an input voltage into an output voltage and outputs the output voltage. The power supply circuit has resistive elements, switches, and capacitors. The resistive elements cause a fraction of the output voltage to develop. The switches are turned on or off in order to enable or disable flow of a current through the resistive elements. When the switches as well as a switch are turned on, the capacitors hold the voltage, which is the fraction of the output voltage developed due to the resistive elements. A control circuit controls the switch so that the voltage will be equal to a reference voltage. Even during a period during which the switches are off, the voltage nearly corresponds with the voltage developed during a period during which the switches are on.

12 Claims, 10 Drawing Sheets

PRIOR ART

Fig.10

PRIOR ART

POWER SUPPLY CIRCUIT WITH MINIMIZED POWER CONSUMPTION

BACKGROUND OF THE INVENTION

1. Field of Invention

The present invention relates to a power supply circuit for feeding power with a small loss, and an electro-optical device to which power is fed using the power supply circuit and which is characterized by low power consumption.

2. Description of Related Art

Figure 9:
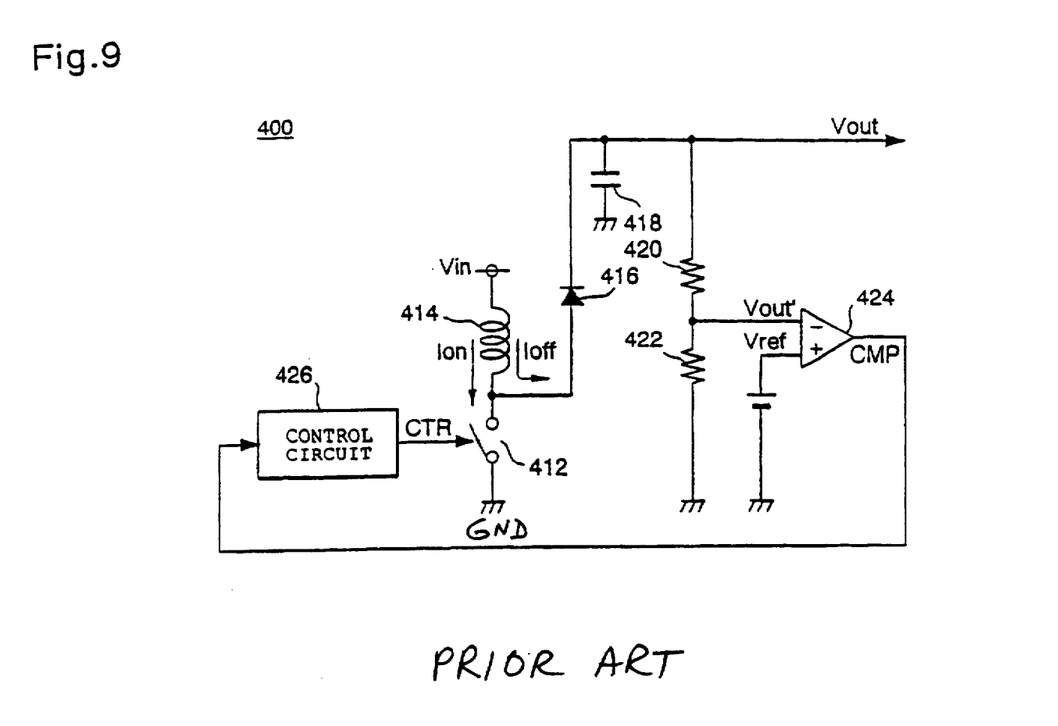
FIG. 9 is a block diagram showing the circuitry of a conventional power supply circuit.

To begin with, a description will be made of a conventional power supply circuit, for example, a power supply circuit for producing a high voltage Vout from a low voltage Vin and supplying the high voltage Vout. FIG. 9 is a block diagram showing the circuitry of a conventional power supply circuit 400. In the drawing, a switch 412 is realized with a transistor in practice, and turned on when a signal CTR that is a gate signal is driven high. One terminal of the switch 412 is connected on a line, over which the voltage Vin is applied, via an inductor (coil) 414. The other terminal thereof is connected on a ground line over which a reference potential GND is applied. One terminal of the switch 412 is connected to one terminal of a capacitor 418 through the conduction in a forward direction of a diode 416. Consequently, a held voltage is output as the voltage Vout The other terminal of the capacitor 418 is connected on the ground line.

Figure 10:
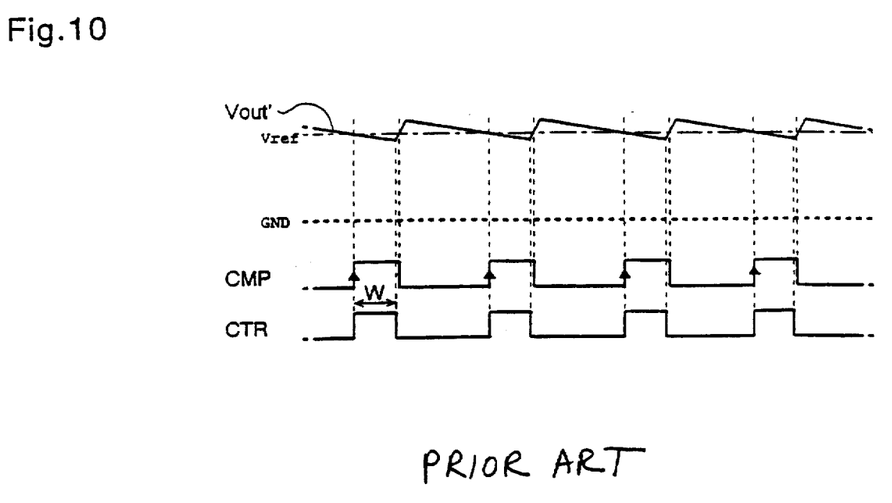
FIG. 10 is a timing chart for explaining the action of the power supply circuit of FIG. 9.

The output voltage Vout developed at one terminal of the capacitor 418 has a fraction thereof developed due to resistors 420 and 422. The fractional voltage is applied to a negative input terminal of a comparator 424. For a clear description, a voltage to be applied to the negative input terminal of the comparator 424 shall be a voltage Vout'. A reference voltage Vref is applied to a positive input terminal of the comparator 424. When the voltage Vout' falls below the reference voltage Vref, an output signal Cow of the comparator 424 is, as shown in FIG. 10, driven high. In contrast, when the voltage Vout' exceeds the reference voltage vref, the output signal CMP is driven low. When the output signal CMP of the comparator 424 is driven high, a control circuit 426 outputs, as shown in FIG. 10, a pulsating signal CTR having a certain pulse width W.

Next, the action of the power supply circuit 400 having the foregoing components will be described. First, the switch 412 is turned on. This causes a current Ion to flow from the line, over which the voltage Vin is applied, through the inductor 414 towards the ground line. Energy is accumulated in the inductor. When the switch 412 is turned off, an off current Ioff flows through the inductor 414. The accumulated energy is added to the voltage Vin through the conduction in the forward direction of the diode 416 according to the series feed. The energy thus moves to the capacitor 418. When the energy accumulated in the inductor 414 has entirely moved to the capacitor 418, the diode 416 is inversely biased. Therefore, the energy accumulated in the capacitor 418 will not flow backward through the diode 416.

On the other hand, the output voltage Vout drops gradually according to the magnitude of a load. As shown in FIG. 10, when the voltage Vout' falls below the Ad reference voltage Vref, the output signal CMP of the comparator 424 makes a low-to-high transition. This causes the control circuit 426 to output the pulsating signal CTR. The switch 412 is then turned on. After energy is accumulated in the inductor 414, the switch 412 is turned off, and the energy moves to the capacitor 418. Consequently, the output voltage Vout rises. In other words, when the voltage Vout' falls below the reference voltage Vref, control is given to raise the output voltage Vout.

When the output voltage Vout rises, the voltage Vout' may exceed the reference voltage Vref. In this case, the output signal CMP of the comparator 424 remains low. The switch 412 is not therefore turned on or off, and the capacitor 418 discharges according to a load. Consequently, the output voltage Vout drops gradually. In other words, when the voltage Vout' exceeds the reference voltage Vref, the discharge of the capacitor 418 causes control to be given for lowering the output voltage Vout.

As a whole, the output voltage Vout is stabilized when control given for raising the output voltage Vout and a control given for lowering it are balanced, that is, when the voltage Vout' becomes equal to the reference voltage Vref. Herein, the voltage Vout' is a fraction of the output voltage Vout developed due to the resistors 420 and 422. Assuming that the resistances of the resistors 420 and 422 are R1 and R2, Vout'=Vout×R2/(R1+R2) is established. The voltage Vout' is stabilized when becoming equal to the reference voltage Vref In other words, the power supply circuit 400 boosts the voltage Vin and outputs the voltage Vout stabilized when becoming equal to Vref(R1+R2)/R2.

SUMMARY OF THE INVENTION

In the foregoing circuitry, a current always flows from the other terminal of the capacitor 418, which serves as the output terminal of the power supply circuit, through the resistors 420 and 422 towards the line over which the ground potential GND is applied. This may pose a problem in that a large magnitude of power consumption occurs in the power supply circuit If the resistances of the resistors 420 and 422 were increased, the problem would be solved. However, it is hard to form a resistor exhibiting a high resistance on an IC chip. Otherwise, the resistor exhibiting a high resistance cannot help being large in size. This may be disadvantageous in realizing a compact and simple power supply circuit in the form of an integrated circuit. Moreover, when the resistances of the resistors 420 and 422 are increased, another problem may occur in that the power supply circuit becomes susceptible to noises.

Moreover, from the viewpoint of simple circuitry, a voltage "Vin-GND" that has not been boosted should be used as a supply voltage to be applied to the control circuit 426 and comparator 424. When the voltage "Vin-GND" is used as the supply voltage to be applied to the comparator 424, the voltage Vout' and reference voltage Vref with which the voltage is compared must fall below "Vin-GND." Noted is that when the voltage "Vin-GND" is used as the supply voltage to be applied to the comparator 424 in an effort to realize simple circuitry, the voltage must not be compared directly with the boosted voltage Vout. Namely, a lower voltage (fractional voltage) produced by stepping down the voltage Vout must be used as a voltage with which the voltage "Vin-GND" is compared.

The present invention attempts at least to break through the foregoing situation. An object of the present invention is to at least provide a power supply circuit capable of minimizing power consumption and contributing to a compact and simple design, and to also provide an electro-optical device using the power supply circuit.

According to an exemplary aspect of the present invention, there is provided a power supply circuit for converting a first voltage that is an input voltage into a second voltage that is an output voltage and outputting the second voltage. The power supply circuit preferably has two or more resistive elements, a pair of first switching elements, and a holding element. The two or more resistive elements cause a fraction of the second voltage to develop. The pair of first switching elements is turned on or off in order to enable or disable flow of a current through the two or more resistive elements. When the pair of first switching elements is turned on, the holding element holds the fractional voltage developed due to the resistive elements. In the power supply circuit, control is given so that the voltage held by the holding element will be equal to a reference voltage. Owing to these constituent features, only when the pair of first switching elements is turned on, a current flows through the two or more resistive elements, causing a fraction of the second voltage to develop. When the first switching elements are turned off, no current flows. A loss in power caused by the resistive elementscanning therefore is suppressed. At this time, the resistive elements need not exhibit a high resistance. This contributes to a compact and simple design. Moreover, the power supply circuit becomes unsusceptible to noises.

According to this exemplary aspect of the present invention, the first voltage is supplied over a first line and a ground line, while the second voltage is supplied over a second line and the ground line. The resistive elements include a first resistive element connected on the second line and a second resistive element connected on the ground line. The first resistive element and second resistor are connected in series with each other. The holding element is preferably composed of a first capacitor interposed between a fractional voltage point, at which the first and second resistive elements cause a fractional voltage to develop, and the second line, and a second capacitor interposed between the fractional voltage point and the ground line. Owing to these constituent features, when the pair of first switching elements is turned off, a voltage held by the first and second capacitors varies with a variation in the second voltage. Consequently, the second voltage can be stabilized and output irrespective of whether the pair of first switching elements is turned on or off.

In the foregoing circuitry, a ratio of the resistance of the first resistive element to that of the second resistive element is, preferably, substantially equal to a ratio of the capacitance of the second capacitor to that of the first capacitor. Owing to this constituent feature, even when the pair of first switching elements is turned off, similarly to when the pair thereof is turned on, the voltage held by the first and second capacitors varies with a variation in the second voltage. The second voltage is therefore stabilized when approximated to a specific value and then output.

According to this exemplary aspect of the present invention, a relatively long period of time is required until the voltage held by the holding element corresponds with a fractional voltage developed due to the resistive elements. This is attributable to the resistances of the resistive elements and the capacitance of the holding element. The pair of first switching elements must be on during the period. When the pair of first switching elements is turned on, a current flows through the resistive elements. This is undesirable in terms of low power consumption. According to this exemplary aspect of the present invention, a buffer for buffering a voltage at the fractional voltage point should preferably be interposed between the fictional voltage point, at which a fractional voltage is developed due to the resistive elements, and the holding device. This obviates the necessity of turning on the pair of first switching elements during the period determined with a time constant required for the holding element relative to the resistive elements. An on period during which the pair of first switching elements is on can therefore be shortened, and a consumed current can be further suppressed.

In the circuitry including the buffer, a second switching element should preferably be interposed between the buffer and the holding element. The second switching element is turned on after or at the same time when the pair of first switching elements is turned on. The second switching element is turned off before or at the same time when the pair of first switching elements is turned off. Owing to this constituent feature, the buffer can be prevented from outputting an unstable voltage immediately after the pair of first switching elements is turned on.

In the circuitry having the buffer, the buffer is preferably disabled from buffering data during at least the period during which the pair of first switching elements is off. Owing to this constituent feature, since an unnecessary action of the buffer is omitted, a consumed current can be suppressed further.

According to another exemplary aspect of the present invention, there is provided an electro-optical device having a plurality of pixels realized with an electro-optical material sandwiched between two opposed substrates. The electro-optical device preferably has a drive circuit for feeding a driving signal, which is used to drive the plurality of pixels, and a power supply circuit for converting a first voltage into a second voltage and applying the second voltage so as to power the drive circuit. The power supply circuit preferably has two or more resistive elements, a pair of first switching elements, and a holding element. The two or more resistive elements cause a fraction of the second voltage to develop. The pair of first switching elements is turned on or off in order to enable or disable flow of a current through the two or more resistive elements. When the pair of first switching elements is turned on, the holding element holds the fractional voltage developed due to the resistive elements. Owing to these constituent features, when the pair of first switching elements is turned off, no current flows. Consequently, a loss in power caused by the resistive elementscanning is suppressed. Moreover, the resistive elements need not exhibit a high resistance. This contributes to a compact and simple design. Besides, the power supply circuit becomes unsusceptible to noises. Furthermore, since the fractional voltage of the second voltage is held in the holding element, the second voltage is output while stabilized.

DETAILED DESCRIPTION OF PREFERRED EMBODIMENTS

Exemplary embodiments of the present invention will be described with reference to the drawings below.

<First Exemplary Embodiment>

Figure 1:
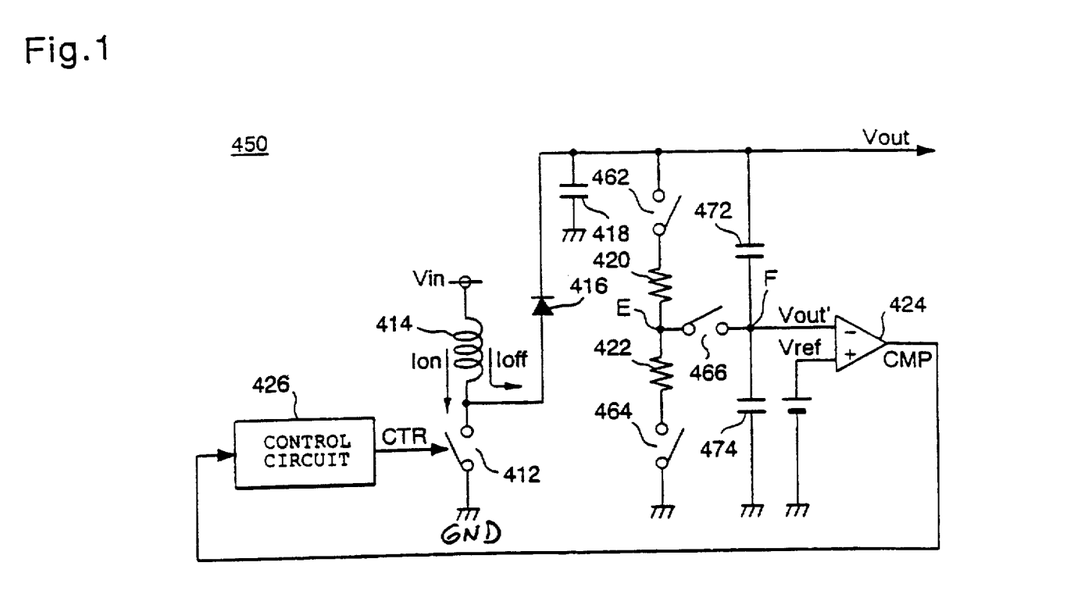
FIG. 1 is a block diagram showing the circuitry of a power supply circuit in accordance with an exemplary embodiment of the present invention.

To begin with, the first exemplary embodiment of the present invention will be described. FIG. 1 is a block diagram showing the circuitry of a power supply circuit 450 in accordance with the present exemplary embodiment. The power supply circuit 450 of FIG. 1 is different from the power supply circuit 400 of FIG. 9 in that switches 462, 464, and 466 and capacitors 472 and 474 are newly included. To be more specific, in the power supply circuit 450, the switch 462 is interposed between one terminal of the capacitor 418 which serves as an output terminal and the resistor 420. The switch 464 is interposed between the ground line over which the reference potential GND is applied and the resistor 422. The switch 466 is interposed between point E, which is the fractional voltage point at which a fractional voltage is developed due to the resistors 420 and 422, and point F that is the negative input terminal of the comparator 424. The capacitor 472 is interposed between point F and one terminal of the capacitor 418 that serves as the output terminal. The capacitor 474 is interposed between point F and the ground line.

Assume that the resistances of the resistors 420 and 422 are R1 and R2 and the capacitances of the capacitors 472 and 474 are C1 and C2. Among the resistances and capacitances, R1/R2=C2/C1 is established. The switches 462, 464, and 466 are controlled to be turned on or off by means of a circuit that is not shown.

Figure 2:
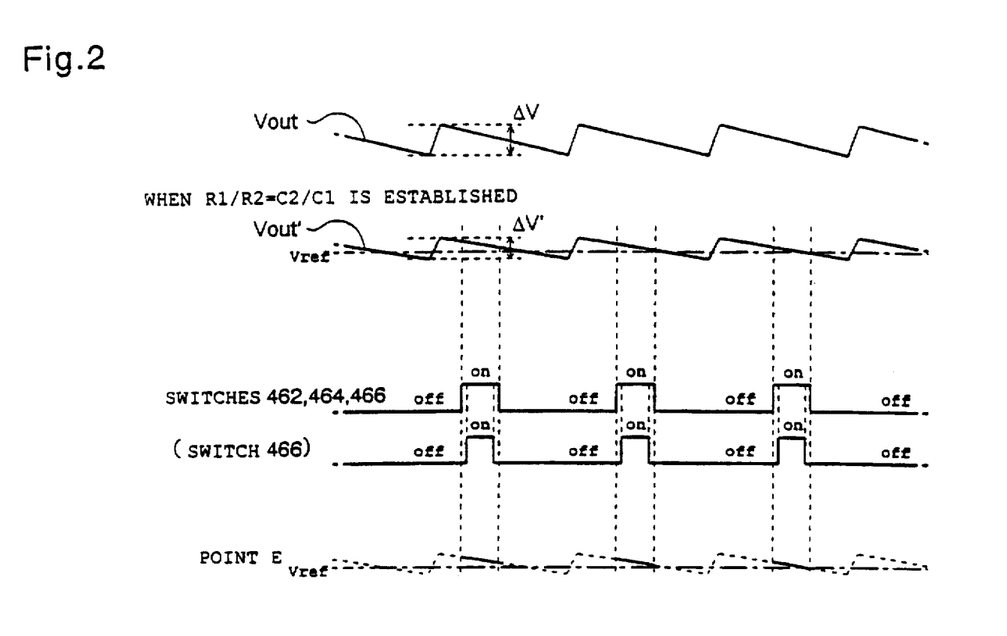
FIG. 2 is a timing chart for explaining the action of the power supply circuit of FIG. 1.

Next, the action of the power supply circuit 450 will be described. FIG. 2 is a timing chart for explaining the action. As illustrated, the switches 462, 464, and 466 are repeatedly turned on or off all together at intervals of a cycle determined in consideration of a leakage caused by the comparator 424.

In the foregoing circuitry, when the switches 462, 464, and 466 are turned on, the potential at point F serving as the negative input terminal of the comparator 424 becomes equal to that at point E. In this state, the capacitors 472 and 474 are charged.

Thereafter, the switches 462, 464, and 466 are turned off. The potential at point E becomes unstable. However, the potential at point F remains the same as the potential at point E attained by the capacitors 472 and 474 immediately before the switches are turned off. Thereafter, the output voltage Vout varies because power is consumed by a load and the switch 412 is turned on or off. However, point F is connected to the output terminal via the capacitor 472 and also connected on the ground line via the capacitor 474. Therefore, the potential at point F becomes equal to a fraction of the output voltage Vout developed based on the ratio of the capacitance of the capacitor 472 to that of the capacitor 474. The capacitances C1 and C2 of the capacitors 472 and 474 are determined in order to satisfy R1/R2=C2/C1.

Consequently, the potential at point F nearly equals to that at point E attained when the switches 462 and 464 are virtually turned on.

According to the power supply circuit 450, no current flows through the resistors 420 and 422 during a period during which the switches 462 and 464 are off. A loss in power caused by the resistorscanning be suppressed. The resistors 420 and 422 need not exhibit a high resistance. This contributes to a compact and simple design. Moreover, the power supply circuit becomes unsusceptible to noises. Furthermore, even during a period during which the switches 462 and 464 are off, the potential at point F that is the negative input terminal of the capacitor 424 nearly agrees with that at point E attained during a period during which the switches 462 and 464 are on. Stable output of the output voltage Vout will not be interrupted.

In the present exemplary embodiment, the switches 462, 464, and 466 are repeatedly turned on and off at intervals of a certain cycle. Alternatively, the switches may be turned on and off irregularly. If a leakage caused by the comparator 424 is small enough, an off period may be extended.

In the present exemplary embodiment, the potential at point E to be attained immediately after the switches 462 and 464 are turned on varies depending on the time constant of a floating capacitance relative to the resistances of the resistors 420 and 422. The switches 462, 464, and 466 are supposed to be turned on or off all together. Either of the switches 462 and 464 may be turned off earlier than the switch 466 because of a difference in the switching ability of one switch from another. In this case, a current leaks out of the capacitors 472 and 474 via the other switches. A holding voltage therefore varies. For this reason, the switch 466 should preferably be designed so that, as indicated in parentheses in FIG. 2, it will be turned on after the switches 462 and 464 are turned on and it will be turned off before the switches 462 and 464 are turned off.

In the present exemplary embodiment, the switch 462 is connected near the line over which the voltage Vin is supplied, and the switch 464 is connected near the ground line. Alternatively, the switches 462 and 464 may be connected near point E that is the fractional voltage point at which a fractional voltage is developed due to the resistors 420 and 422.

<Second Exemplary Embodiment>

Figure 3:
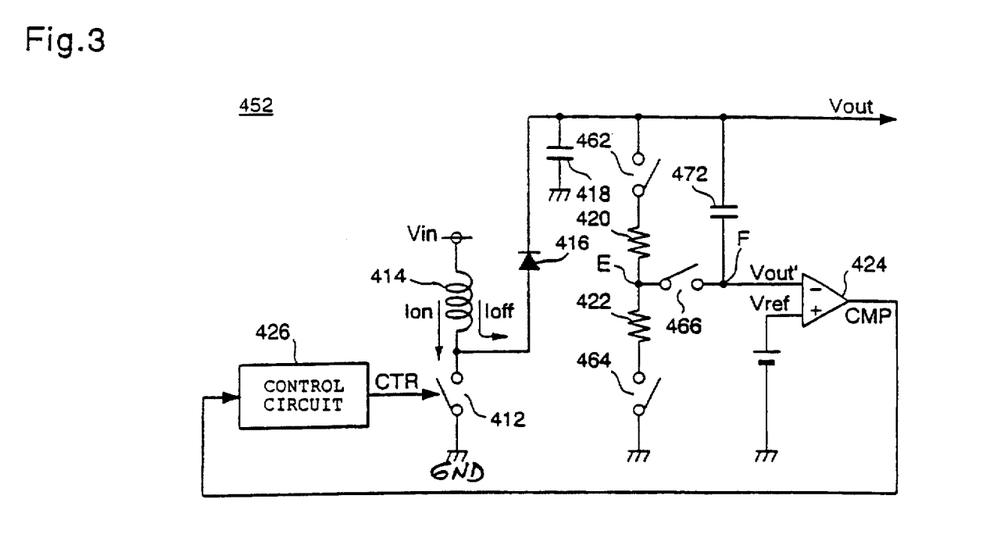
FIG. 3 is a block diagram showing the circuitry of a power supply circuit in accordance with another exemplary embodiment of the present invention.
Figure 4:
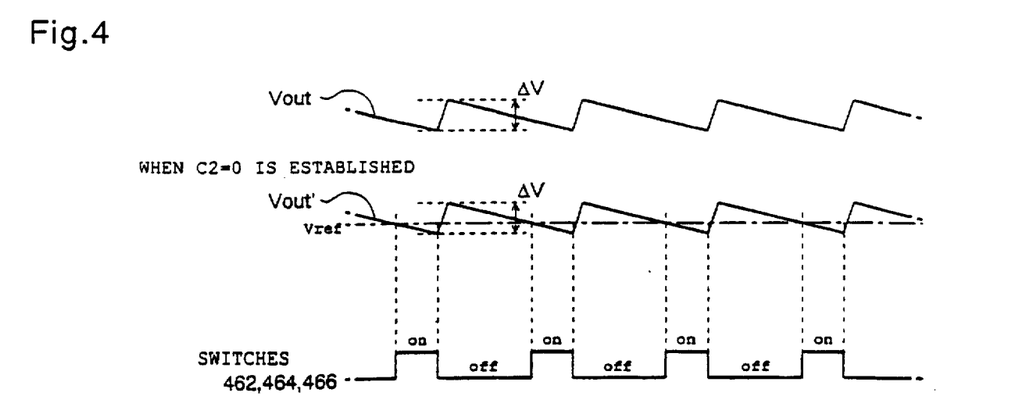
FIG. 4 is a timing chart for explaining the action of the power supply circuit of FIG. 3.

Next, the second exemplary embodiment of the present invention will be described. FIG. 3 is a block diagram showing the circuitry of a power supply circuit 452 in accordance with the present embodiment. The power supply circuit 452 of FIG. 3 is different from the power supply circuit 450 in accordance with the first exemplary embodiment (see FIG. 1) in a point that the capacitor 474 interposed between point F and the ground line is excluded. In this circuitry, one capacitor can be excluded. However, the voltage at point F developed during a period during which the switches 462, 464, and 466 are off varies, as shown in FIG. 4, within the same variation width $\Delta V$ as the voltage Vout does. The voltage at point F therefore does not correspond with the voltage at point E developed during a period during which the switches 462 and 464 are on. The voltage Vout' at point F with which the comparator 424 compares a voltage contains an error equivalent to the width. This is undesirable in terms of stable output. Specifically, assuming that the variation width of the output voltage Vout is $\Delta V$, a variation width of the voltage at point E is expressed as $\Delta V \times R2/(R1+R2)$ because of the resistors 420 and 422 due to which a fractional voltage is developed. However, point F is connected to the output terminal via the capacitor 472 alone.

As long as the switches 462, 464, and 466 are off, the voltage Vout' varies within the same variation width ΔV as the output voltage Vout does.

A difference between a fractional voltage of the output voltage Vout produced due to the resistors 420 and 422 and the voltage Vout' at point F developed when the switch 466 is off is diminished when the latter voltage Vout' is close to the reference voltage Vref The switches 462, 464, and 466 are therefore turned on when, as shown in FIG. 4, the voltage Vout' at point F falls below the reference voltage Vref and energy from the inductor 414 moves to the capacitor 418 to thus boost the voltage at the capacitor 418. More particularly, the switches are turned on when the output signal CMP of the comparator 424 is high and the control signal CTR output from the control circuit 426 is high. Thus, an error of the voltage Vout' at point F from the output voltage Vout is suppressed, and the output voltage Vout is stabilized at the specific value.

In the circuitry, the variation width of the output voltage Vout corresponds with that of the voltage at point F as long as the switches 462, 464, and 466 are off. Therefore, even when the ratio of the output voltage Vout resulting from boosting to the voltage Vin is high and the resistance R1 of the resistor 420 is higher than the resistance R2 of the resistor 422, a gain to be produced by the comparator 424 can be decreased. Consequently, the power supply circuit can act on a stable basis. This leads to lower power consumption.

<Third Exemplary Embodiment>

In the aforementioned first or second exemplary embodiment, when it is required for corresponding the potential at point E and the potential at point F, which serves as the negative input terminal of the comparator 424, with each other, an on period during which the switches 462, 464, and 466 are on must be long enough. This is because consideration must be taken into the time constants of the capacitances C1 and C2 of the capacitors 472 and 474 and the floating capacitance relative to the resistances R1 and R2 of the resistors 420 and 422. However, when the on period during which the switches 462 and 464 are on is extended, a larger current may flow through the resistors 420 and 422. This is undesirable in terms of low power consumption.

Figure 5:
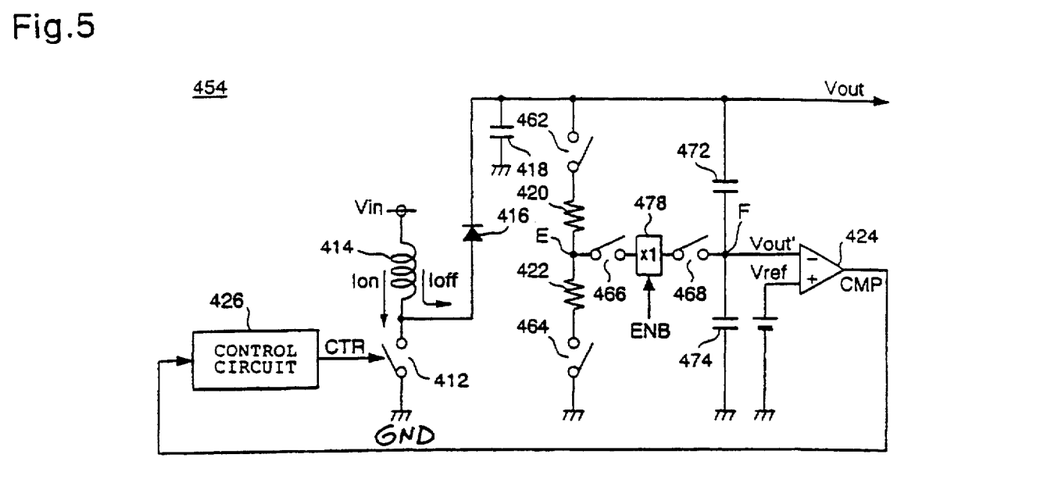
FIG. 5 is a block diagram showing the circuitry of a power supply circuit in accordance with another embodiment of the present invention.

A description will be made of the third exemplary embodiment. FIG. 5 is a block diagram showing the circuitry of a power supply circuit 454 in accordance with the present exemplary embodiment. The power supply circuit 454 of FIG. 5 is different from the power supply circuit 450 in accordance with the first embodiment (see FIG. 1) in a point that a buffer 478 and a switch 468 are interposed between the switch 466 and point F. The buffer 478 amplifies a signal at an amplification factor 1 without reversing the polarity of the signal (buffering) only when an enabling signal ENB is high.

Figure 6:
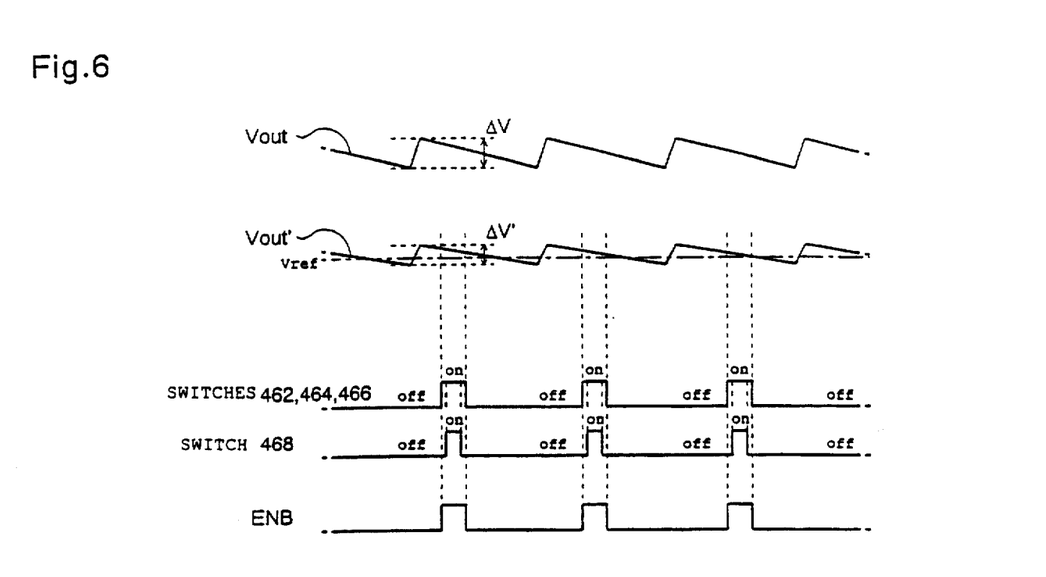
FIG. 6 is a timing chart for explaining the action of the power supply circuit of FIG. 5.

In general, an input impedance offered by a buffer is higher than an output impedance offered thereby. The potential at point F can therefore correspond with that at point E immediately. As shown in FIG. 6, in the third exemplary embodiment, the on period during which the switches 462, 464, and 466 are on can be made shorter than the on period set according to the first and second exemplary embodiments. Accordingly, power to be consumed by the resistors 420 and 422 can be suppressed.

The switch 468 is turned on after the switches 462, 464, and 466 are turned on, and turned off after the switches 462, 464, and 466 are turned off. Therefore, the potential at point E that is unstable immediately after the switches 462, 464, and 466 are turned on is prevented from being applied to point F serving as the negative input terminal of the comparator 424. In this circuitry, the on-off timing of the switches 462, 464, and 466 need not correspond with one another. The switch 466 may be turned on after the switches 462 and 464 are turned on and before the switch 468 is turned on. The switch 466 may be turned off before the switches 462 and 464 are turned off and after the switch 468 is turned on.

Buffering must be performed using the buffer 478 only during a period during which the switch 466 is on. The action of buffering is therefore enabled only during the period. However, in the circuitry, the action speed of the buffer may become critical. For this reason, as shown in FIG. 6, the enabling signal ENB is driven high for only a period during which the switches 462, 464, and 466 are on. The action of buffering is enabled during the period. Thus, the action should preferably be performed during a period of time longer than a required time.

Needless to say, the capacitor 474 in the power supply circuit 454 in accordance with the third exemplary embodiment may be excluded similarly to that in the power supply circuit 452 in accordance with the second exemplary embodiment. Moreover, a protective diode may be connected to the input terminal of the buffer 478 if necessary.

In addition, the actions of the power supply circuits in accordance with the aforementioned exemplary embodiments have been described in relation mainly to a steady state in which the output voltage Vout is stabilized. The switches 462, 464, 466, and 468 are turned on or off cyclically or irregularly. Alternatively, the switches may be held on immediately after power is fed, that is, until the output voltage Vout is produced by boosting the voltage Vin up to the specific voltage. Once the voltage Vin has reached the specific voltage, the switches may be started to be turned on or off.

Moreover, the aforementioned exemplary embodiments are implemented in a step-up power supply circuit. Alternatively, an inverting power supply circuit for inverting the polarity of an input voltage and outputting a reverse voltage or a step-down power supply circuit for outputting a voltage lower than an input voltage will do.

<Fourth Exemplary Embodiment>

Figure 7:
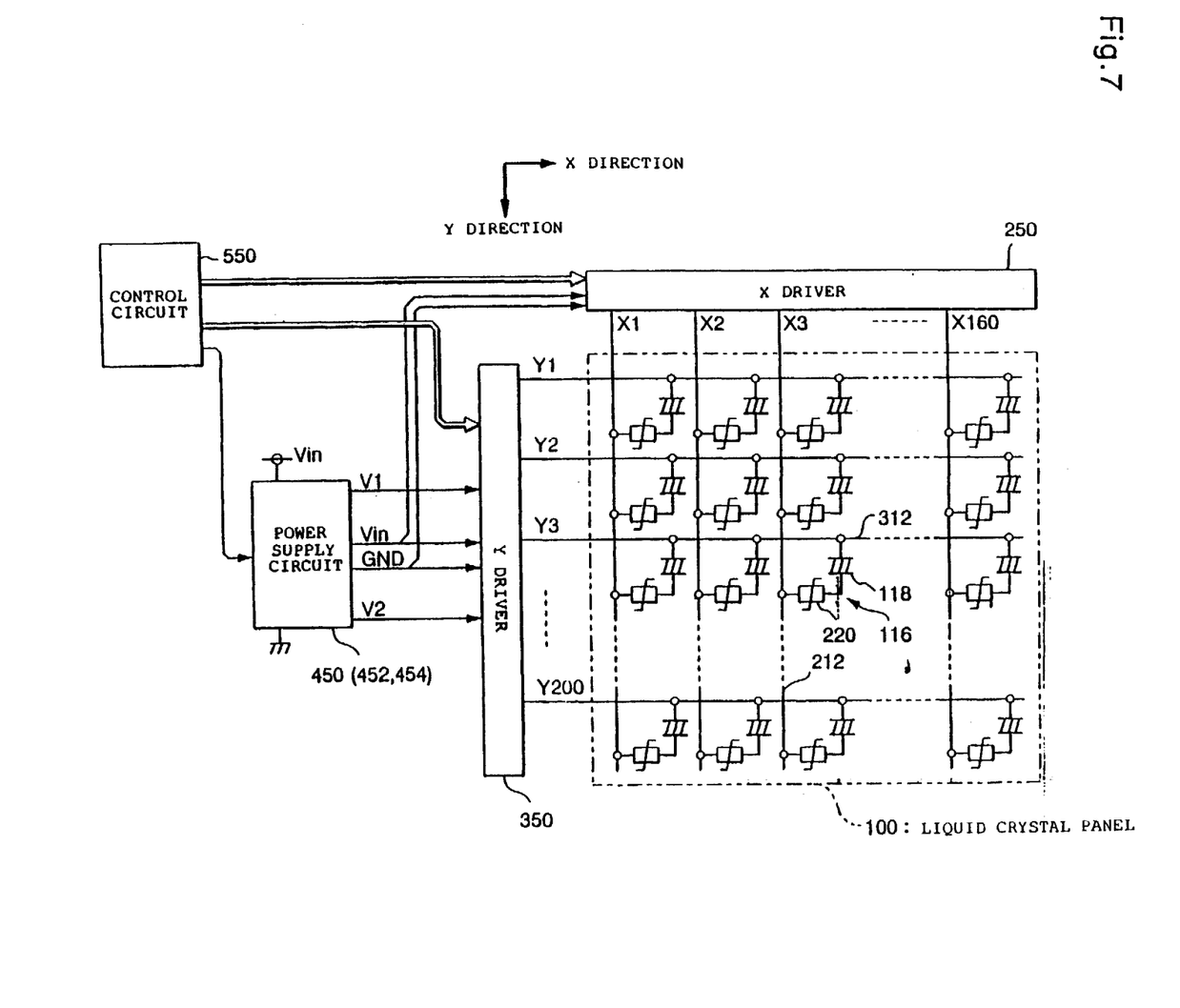
FIG. 7 is a block diagram showing the electrical configuration of a liquid crystal display device that is an example of an electro-optical device in accordance with another exemplary embodiment of the present invention.

Next, a description will be made of a liquid crystal display device in accordance with the fourth exemplary embodiment of the present invention. A liquid crystal display device is an example of an electrooptical device. The aforementioned power supply circuit 450,452, or 454 is adapted to the liquid crystal display device. FIG. 7 is a block diagram showing the electrical configuration of the liquid crystal display device. In FIG. 7, 160 data lines 212 are formed in columns (in a Y direction) in a liquid crystal panel 100, and 200 scanning lines 312 are formed in rows (in an X direction) therein. Pixels 116 are formed at intersections between the data lines 212 and scanning lines 312. The pixels 116 are each realized by connecting a liquid crystal display element (liquid crystal layer) 118 in series with a thin film diode (TFD) 220.

Figure 8:
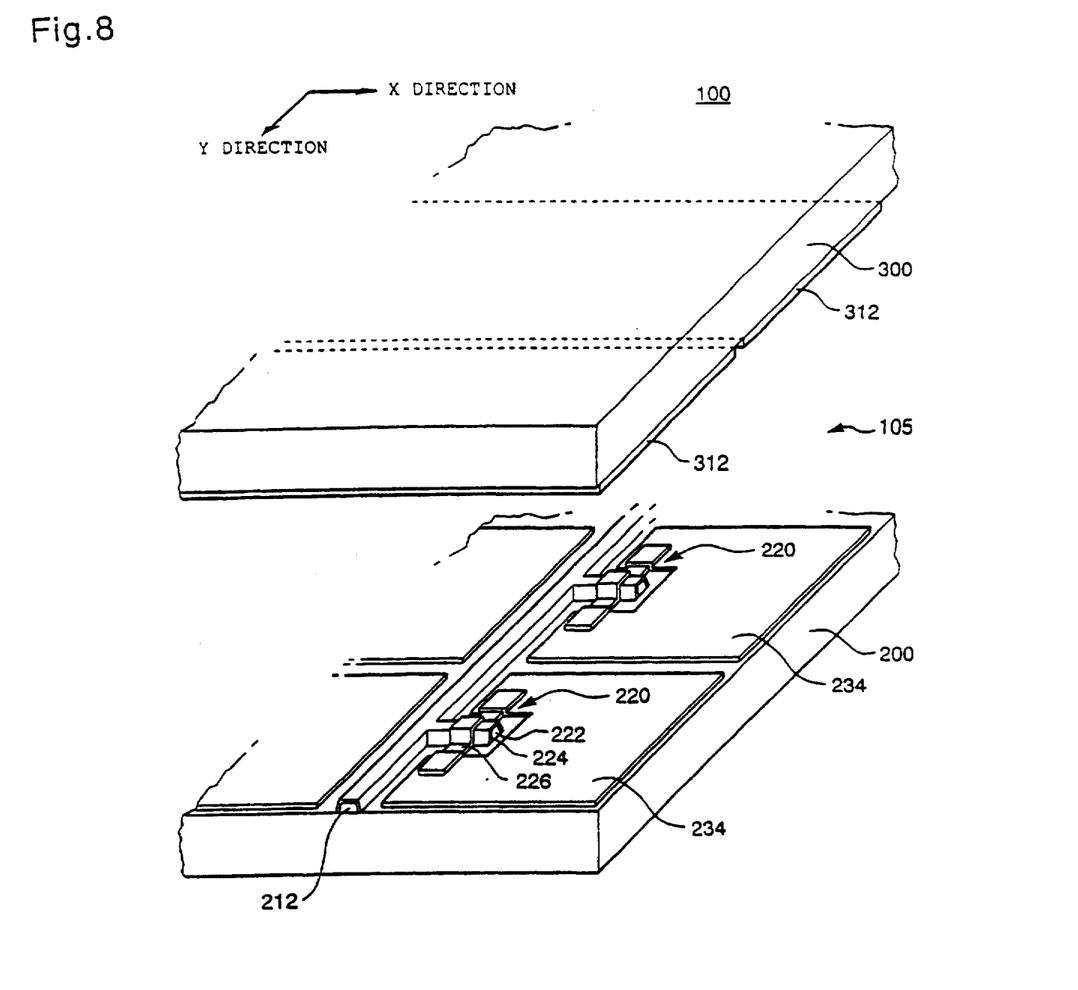
FIG. 8 is a cutaway perspective view showing the structure of a major portion of a liquid crystal panel of the liquid crystal display device of FIG. 7.

The structure of the liquid crystal panel 100 will be detailed below. FIG. 8 is a partially cutaway perspective view illustratively showing the structure. As illustrated, the liquid crystal panel 100 consists of an element substrate 200 and an opposing substrate 300 opposed to the element substrate 200. A plurality of pixel electrodes 234 is arranged in the form of a matrix on an opposing surface of the element substrate 200 that opposes to the opposing substrate 300. Pixel electrodes 234 arranged in a column are connected on one data line 212, which is extended in a column like a rectangular piece, via the TFDs 220.

The TFD 220 is composed of a first metallic film 222, an oxide film 224 produced by anodizing the first metallic film 222, and a second metallic film 226 when viewed from the substrate, and has a metal/dielectric/metal sandwich structure. The TFD 220 thus exhibits the same switching characteristic in both positive and negative directions as a diode switch.

On an opposing surface of the opposing substrate 300, the scanning lines 312 are extended in rows orthogonal to the data lines 212, and are arranged to serve as electrodes opposing the pixel electrodes 234.

The thus-formed element substrate 200 and opposing substrate 300 are separated from each other with a certain distance held between them owing to a sealant (not shown) applied to the margins of the substrates and a spacer (not shown) scattered appropriately. For example, the closed space is filled with a twisted nematic liquid crystal 105, whereby the liquid crystal layers 118 shown in FIG. 7 are formed. In other words, the liquid crystal layer 118 at each intersection between the data line 212 and scanning line 312 is composed of the scanning line 312, pixel electrode 234, and liquid crystal 105 lying between the scanning line 312 and pixel electrode 234.

Moreover, color filters arranged in the form of a stripe, mosaic, or triangle may be attached to the opposing substrate 300 according to the usage of the liquid crystal panel 100. A black matrix screen for intercepting light may be formed to cover a portion other than the portion of the opposing substrate 300 occupied by the color filters. In addition, an orientation film rubbed in a predetermined direction is placed on each of the opposing surfaces of the element substrate 200 and opposing substrate 300. A polarizer whose property is determined with a direction in which liquid crystalline molecules are aligned is placed on each of the backs of the substrates (not shown).

If a polymeric liquid crystal having a liquid crystal diffused as particulates in a polymer is adapted to the liquid crystal panel 100, the aforementioned orientation film and polarizer are unnecessary. This leads to higher light utility. The adaptation of the polymeric liquid crystal is advantageous in terms of high brightness and low power consumption characterizing the liquid crystal panel 100. Moreover, when the liquid crystal panel 100 is realized with a reflective liquid crystal panel, the pixel electrodes 234 may be formed with a metallic film exhibiting a high reflectance, such as, aluminum. A super homeotropic liquid crystal having liquid crystalline molecules aligned nearly perpendicularly with no voltage applied may be adopted.

The TFD 220 is an example of a two-terminal nonlinear element. Alternatively, a zinc oxide (ZnO) varistor, an element produced using a metal semi-insulator (MSI), or an element produced by connecting these two elements in series or parallel with each other in opposite directions will do.

Referring back to FIG. 7, an X driver 250 is generally called a data line drive circuit. The X driver 250 supplies data signals X1 to X160 to the respective data lines 212 according to the contents of display data. The voltage of the data signal is defined with either of the voltages Vin and GND. On the other hand, a Y driver 350 is generally called a scanning line drive circuit. The Y driver 350 selects the scanning lines 312 one by one, and applies a selection voltage V1 or V2 to a scanning line 312 during a selected period during which the scanning line 312 is sequentially selected. The Y driver 350 applies a non-selection voltage Vin or GND to scanning lines during an unselected period during which the scanning lines are unselected.

A power supply circuit 450 boosts a single supply voltage "Vin-GND" to produce the selection voltage V1 of positive polarity. The power supply circuit 450 inverts the polarity of the voltage V1 using an intermediate value of the voltage "Vin-GND" as a reference value, and thus produces the selection voltage V2 of negative polarity. The voltages Vin and GND are used as a non-selection voltage of positive polarity and a non-selection voltage of negative polarity as they are.

Assuming that a certain scanning line 312 is selected and the selection voltage V1 is applied to the scanning line 312 during the selected period, associated TFDs 220 become conducting. When the TFDs 220 are conducting, the data signals are applied to the TFDs 220 over the data lines 212. Consequently, a predetermined charge is accumulated in the liquid crystal layers 118 connected to the TFDs 220. Thereafter, the non-selection voltage Vin is applied to the TFDs 220. This causes the TFDs 220 to become nonconducting. Nevertheless, if the TFDs 220 causes a little leakage (off leakage) and the liquid crystal layers 118 provide sufficiently high resistance, the charges accumulated in the liquid crystal layers 118 are held intact. When all the scanning lines 312 have been selected and one vertical scanning period has elapsed, the same scanning line 312 is selected again. During the selected period, the selection voltage V2 is applied to the scanning line 312. The associated TFDs 220 become conducting. While the TFDs 220 are conducting, the data signals are applied to the TFDs 220 over the data lines 212. The predetermined charge is accumulated in the liquid crystal layers 118 connected to the TFDs 220. Thereafter, the non-selection voltage GND is applied to the TFDs 220. This causes the TFDs 220 to become nonconducting. Nevertheless, the charges accumulated in the liquid crystal layers 118 are held intact. Thus, each TED 220 is driven alternately with voltages of opposite polarities in order to control an amount of charge to be accumulated. Consequently, the aligned state of liquid crystalline molecules varies depending on each pixel. Eventually, predetermined information can be displayed.

According to the present exemplary embodiment, the liquid crystal panel 100 has been described by taking for instance a liquid crystal panel having the TFDs 220. The present invention is not limited to this type of liquid crystal panel. Alternatively, a liquid crystal panel having thin film transistors (TFTs) will do. In this type of liquid crystal panel, scanning lines and data lines are formed on one substrate, and the TFTs located at the intersections between the scanning lines and data lines have the gates thereof connected on the scanning lines and the sources thereof connected on the data lines. In addition, the present invention can be implemented in a passive liquid crystal panel having no switching element but including a super twisted nematic liquid crystal. Furthermore, the present invention can be implemented in an electroluminescent display device having luminescent layers arranged instead of the liquid crystal layers, or any other electro-optical device for displaying data using various electro-optical effects.

As described so far, according to the present invention, a current does not always flow through resistive elements. A loss in power caused by the resistive elementscanning therefore be suppressed. Moreover, the resistive elements need not exhibit a high resistance. This contributes to a compact and simple design. Moreover, a power supply circuit becomes unsusceptible to noises.

What is claimed is:

1. A power supply circuit that converts a first voltage that is an input voltage into a second voltage that is an output voltage, and that outputs said second voltage, the power supply circuit comprising:

two or more resistive elements that cause a development of a fractional voltage of said second voltage;

a pair of first switching elements that are switched in order to enable or disable flow of a current through said two or more resistive elements; and a holding element that, when said pair of first switching elements are switched, holds the fractional voltage developed due to said two or more resistive elements, the fractional voltage held by the holding element being controlled so as to be substantially equal to a reference voltage.

2. The power supply circuit according to claim 1, said first voltage being applied over a first line and a ground line, and said second voltage being applied over a second line and said ground line;

said two or more resistive elements comprising a first resistive element connected on said second line and a second resistive element connected on said ground line, said first resistive element and said second resistive element being serially connected with each other, and said holding element comprising a first capacitor interposed between a fractional voltage point, at which said fractional voltage is developed due to said first resistive element and said second resistive element, and said second line, and a second capacitor interposed between said fractional voltage point and said ground line.

3. The power supply circuit according to claim 2, a ratio of a resistance of said first resistive element to a resistance of said second resistive element being substantially equal to a ratio of a capacitance of said second capacitor to that of said first capacitor.

4. The power supply circuit according to claim 1, further comprising a buffer interposed between said fractional voltage point, at which said fractional voltage is developed due to said two or more resistive elements, and said holding element, and used to buffer said voltage at said fractional voltage point.

5. The power supply circuit according to claim 4, further comprising a second switching element interposed between said buffer and said holding element, turned on after or at the same time when said pair of first switching elements is turned on, and turned off before or simultaneously when said pair of first switching elements is turned off.

6. The power supply circuit according to claim 4, said buffer being disabled from buffering a signal during at least a period during which said pair of first switching elements is off.

7. The power supply circuit according to claim 1, the fractional voltage held by the holding element being controlled so as to be within a voltage range, the voltage range including the reference voltage.

8. The power supply circuit according to claim 1, further including a comparator that conpares the output voltage to the fractional voltage and outputs a signal that provides control such that the fractional voltage is substantially equal to the reference voltage.

9. The power supply circuit according to claim 1, the pair of first switching elements being switchable between on and off.

10. The power supply circuit according to claim 9, the holding element holding the fractional voltage when the pair of switching elements are off.

11. The power supply circuit according to claim 9, the holding element holding the fractional voltage when the pair of switching elements are on.

12. An electro-optical device having a plurality of pixels realized with an electro-optical material sandwiched between two mutually opposed substrates, comprising:

a drive circuit that applies a driving signal to drive said plurality of pixels; and a power supply circuit that converts a first voltage into a second voltage and applying the second voltage to power said drive circuit, said power supply circuit comprising:

two or more resistive elements that cause a development of a fractional voltage of said second voltage;

a pair of first switching elements that are switched in order to enable or disable flow of a current through said two or more resistive elements; and a holding element that, when said pair of first switching elements are switched, holds the fractional voltage developed due to said two or more resistive elements, the fractional voltage held by the holding element being controlled so as to be substantially equal to a reference voltage.

* * * * *